United States Patent
Wuestenberg

(10) Patent No.: US 10,753,409 B2
(45) Date of Patent: Aug. 25, 2020

(54) MECHANICAL CLUTCH DEVICE AND METHOD FOR OPERATING A MECHANICAL CLUTCH DEVICE

(71) Applicant: Rolls-Royce Deutschland Ltd & Co KG, Blankenfelde-Mahlow (DE)

(72) Inventor: Hannes Wuestenberg, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 16/052,249

(22) Filed: Aug. 1, 2018

(65) Prior Publication Data
US 2019/0055999 A1 Feb. 21, 2019

(30) Foreign Application Priority Data
Aug. 18, 2017 (EP) .................... 17186922

(51) Int. Cl.
*F02C 7/36* (2006.01)
*F16D 43/21* (2006.01)
(Continued)

(52) U.S. Cl.
CPC ........... *F16D 43/215* (2013.01); *F01D 21/14* (2013.01); *F02C 7/36* (2013.01); *F02K 3/06* (2013.01);
(Continued)

(58) Field of Classification Search
CPC .... F16D 43/215; F16D 2300/12; F16D 41/22; F16D 47/04; F16D 43/20; F02C 7/36;
(Continued)

(56) References Cited

U.S. PATENT DOCUMENTS

| 2,151,724 A | 3/1939 | Wengel et al. |
| 3,997,042 A | 12/1976 | Langham |

(Continued)

FOREIGN PATENT DOCUMENTS

| DE | 2745131 A1 | 4/1979 |
| DE | 102008062088 A1 | 6/2010 |

(Continued)

OTHER PUBLICATIONS

European Search Report dated Apr. 9, 2018 from counterpart European App No. 17186922.5, (8 pages).
(Continued)

*Primary Examiner* — Roger L Pang
(74) *Attorney, Agent, or Firm* — Shuttleworth & Ingersoll, PLC; Timothy J. Klima

(57) ABSTRACT

A mechanical clutch device for coupling two connecting parts in a gas turbo engine, in particular a geared aircraft turbofan engine, with means to automatically trigger a position change of one of the connecting parts relative to the respective other connecting parts and/or relative to an engine part from the first position into a second position in dependence of a torque effective on the connecting parts and/or the engine part, in particular through the transmission via a shaft, in particular a non-nominal torque, more in particular a reversal in the direction of the torque. It also relates to a method for operating a mechanical clutch device.

17 Claims, 8 Drawing Sheets

(51) Int. Cl.
*F16D 41/22* (2006.01)
*F16D 47/04* (2006.01)
*F02K 3/06* (2006.01)
*F01D 21/14* (2006.01)
*F16D 43/20* (2006.01)

(52) U.S. Cl.
CPC ............. *F16D 41/22* (2013.01); *F16D 43/20* (2013.01); *F16D 47/04* (2013.01); *F05D 2260/4023* (2013.01); *F05D 2260/40311* (2013.01); *F05D 2260/52* (2013.01); *F16D 2300/12* (2013.01)

(58) Field of Classification Search
CPC ... F05D 2260/40311; F05D 2260/4023; F05D 2260/52
See application file for complete search history.

(56) References Cited

U.S. PATENT DOCUMENTS

| | | | |
|---|---|---|---|
| 4,214,440 A | | 7/1980 | Ruecker et al. |
| 4,253,557 A | * | 3/1981 | Bunger ............... F16D 43/216 192/34 |
| 5,533,825 A | | 7/1996 | Stone |
| 6,148,605 A | * | 11/2000 | Lardellier ............... F01D 1/30 415/123 |
| 6,212,889 B1 | | 4/2001 | Martin |
| 2002/0069637 A1 | | 6/2002 | Becquerelle et al. |
| 2004/0156669 A1 | | 8/2004 | Lejeune |
| 2005/0220384 A1 | | 10/2005 | Plona |
| 2008/0098717 A1 | | 5/2008 | Orlando et al. |
| 2008/0120839 A1 | | 5/2008 | Schilling |
| 2010/0162684 A1 | | 7/2010 | Baker |
| 2014/0064915 A1 | * | 3/2014 | Masson ................. F02C 3/113 415/1 |
| 2014/0271135 A1 | | 9/2014 | Sheridan et al. |
| 2014/0306064 A1 | | 10/2014 | Palmer |
| 2015/0337762 A1 | | 11/2015 | Penda et al. |
| 2016/0130975 A1 | | 5/2016 | Chilton et al. |
| 2016/0160875 A1 | | 6/2016 | Schwarz |
| 2016/0273448 A1 | | 9/2016 | Duprez |
| 2016/0298751 A1 | | 10/2016 | McCune |
| 2017/0002869 A1 | | 1/2017 | Lee et al. |
| 2017/0081973 A1 | | 3/2017 | Swift et al. |
| 2017/0082065 A1 | | 3/2017 | Swift et al. |
| 2017/0175753 A1 | | 6/2017 | Tan-Kim et al. |
| 2017/0175874 A1 | | 6/2017 | Schwarz et al. |
| 2018/0073384 A1 | * | 3/2018 | Bordoni .................. F02K 3/06 |
| 2018/0363665 A1 | | 12/2018 | Sheridan et al. |
| 2019/0055999 A1 | | 2/2019 | Wuestenberg |

FOREIGN PATENT DOCUMENTS

| | | |
|---|---|---|
| EP | 2998557 A1 | 3/2016 |
| EP | 3121469 A1 | 1/2017 |
| EP | 3296524 A1 | 3/2018 |
| WO | 2016151236 A1 | 9/2016 |

OTHER PUBLICATIONS

German Search Report dated Apr. 17, 2018 from related German Patent Application No. 102017214464.5.
European Search Report dated Jan. 15, 2019 from related European Patent Application No. 18187530.3.

* cited by examiner

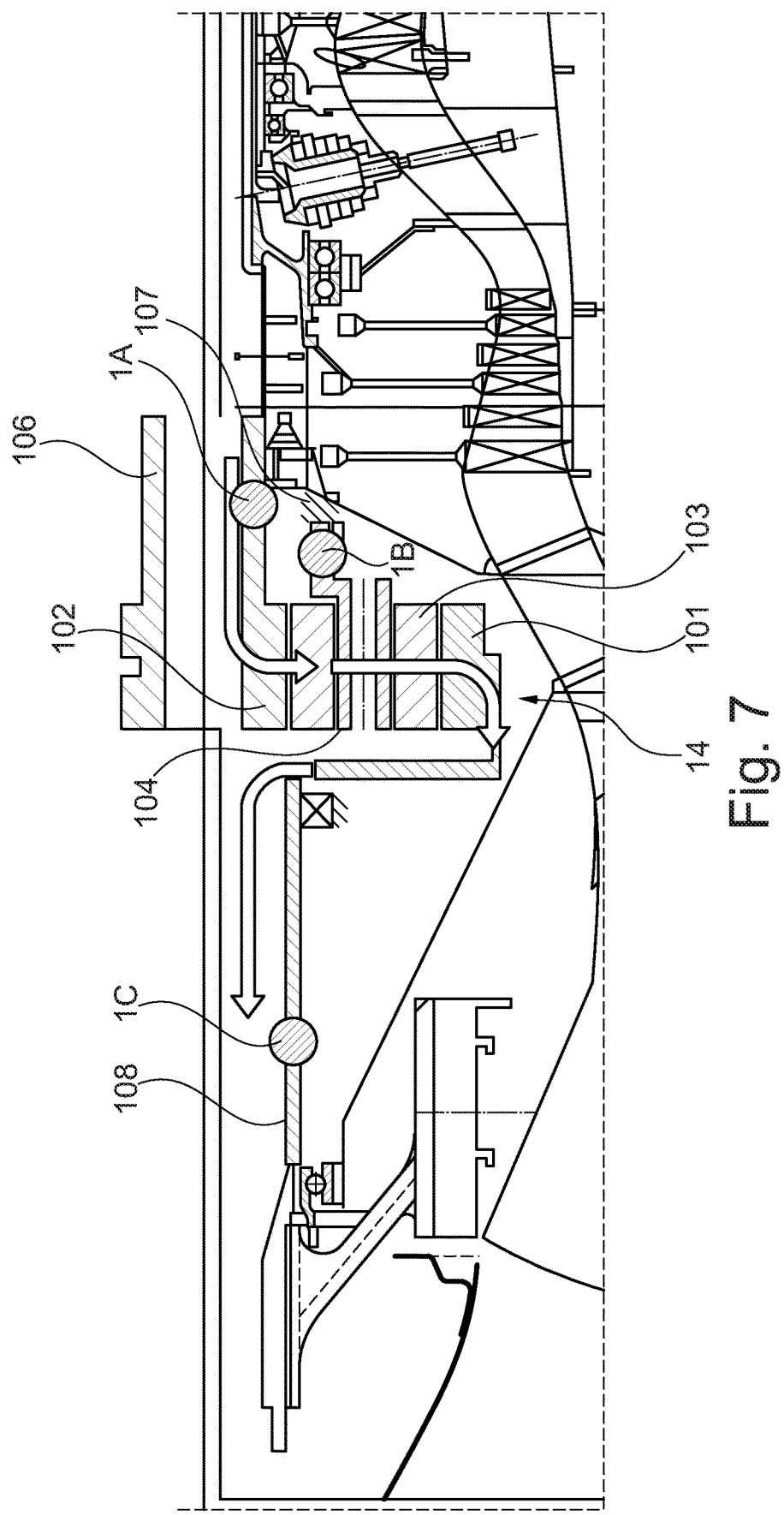

MECHANICAL CLUTCH DEVICE AND METHOD FOR OPERATING A MECHANICAL CLUTCH DEVICE

This application claims priority to European Patent Application 17186922.5 filed Aug. 18, 2017, the entirety of which is incorporated by reference herein.

The invention relates to a mechanical clutch device as disclosed herein and a method for operating a mechanical clutch device as disclosed herein.

Gas turbine engines, in particular geared turbofan aircraft engines, sometimes require some means to mitigate damages that might occur after a failure. A failure might involve the rotation prevention of at least one part of the drive train. Such a failure might be e.g. a shaft breaking, a rotor-casing contact or a bearing seizure. This becomes even more important for high bypass aircraft engines, in which the drag of a locked fan would be considerable. In other cases the deliberate disengagement/engagement of engine parts might be required.

Therefore, gas turbo engines, in particular geared aircraft turbofan engines with an improved engagement and/or disengagement capability, are required.

This is addressed by a mechanical clutch device with the features of claim 1. The mechanical clutch device is intended for the coupling/decoupling of two connection parts in a gas turbo engine, in particular a geared aircraft turbofan engine.

The mechanical clutch device comprises means to automatically trigger a position change of one of the connecting parts relative to the respective other connecting part and/or relative to an engine part from the first position into a second position. This position change can be e.g. a disengagement or a reengagement of the connecting parts.

The position change takes place in dependence of a torque effective on the connecting parts and/or the engine part, in particular through the transmission via a shaft, in particular a non-nominal torque, more in particular a reversal in the direction of the torque.

In one embodiment, the means to automatically trigger the position change in the mechanical clutch device comprise a helical spline connection between the connection parts, an automatic clutch device and/or a hydraulic means for changing the position of the connecting parts depending on the torque effective on the connecting parts and/or the engine part, in particular through the transmission via the shaft, in particular a non-nominal torque or a reversal in the direction of the torque. All the means can have different torque transmission characteristics depending on the torque input (i.e. the absolute value as well as the direction of the torque). In a further embodiment the torque transmission characteristics of the helical spline connection is asymmetric relative to the torque applied to the helical spline connection and/or the automatic clutch comprises a means for balancing different axial loads on a shaft.

The position change can also involve other parts of the gas turbo engine, allowing a more complex coupling. In the first position of one embodiment the connecting parts are mechanically engaged with each other and/or with the engine part, so that torque is transmittable between the connecting parts and in the second position the connecting parts are mechanically disengaged with each other and/or the engine part, enabling a torque-free relative movement between the connecting parts and the engine part. The connecting parts can e.g. form a clutch-like device clamping a static engine part.

In one further embodiment, the first and/or second connecting part are coupled to the ring gear mount of the gearbox, the first and/or second connecting part are rigidly connected to the ring gear mount of the gearbox, the first and/or second connecting part are in one piece with the ring gear mount of the gearbox or to a support structure of the engine, such as a casing.

The first and/or second connecting part can in one embodiment be coupled to the input shaft and/or the output shaft of the gearbox.

In particular—but not exclusively—the mechanical clutch device can be e.g. used to release the ring gear mount decoupling a driven part, in particular a propulsive fan in the case of a disruptive event (e.g. gearbox seizure).

In one embodiment, an engine part is positioned in the first position fixedly relative to the two connecting parts, in particular form-locked and/or friction-locked with the connecting parts and in the second position at least one of the connecting parts is movable relative to the engine part.

This can e.g. be achieved with an embodiment with a clutch device with the first and second connecting parts comprising contact interfaces to the engine part, the contact interfaces being parallel to each other or angled to each other.

Furthermore, in another embodiment, the engine part comprises a ring like structure which is positioned in the first position of the mechanical clutch device between the two connecting parts also comprising ring like structures. Together, the ring like structures form a three plate flange.

Another embodiment further comprises a clamping preloading device to apply a predetermined torque to the mechanical clutch device, in particular pressing at least one of the connecting parts against the (e.g. static) engine part with a preload force. A further embodiment of the mechanical clutch device comprises an axial retention device. The axial retention device keeps e.g. the helical spline connected at all time. That e.g. can be realized with a stop between two static parts.

To improve the torque transmission in one embodiment the connection between the at least one connection part and the engine part comprises a high friction coating on at least one surface of the interface.

In a further embodiment the connection between the clamping preloading means and engine part and/or the connection between the axial retention device and the connecting part comprises a low friction coating on at least one surface.

In one embodiment the mechanical clutch device is coupled to a propulsive fan of a geared aircraft turbofan engine, the propulsive fan being configured to drive an electrical generator in windmilling operation conditions. If the propulsive fan is not actively driven by the primary power source such as the turbine, the fan should at least freely rotate (windmilling) because otherwise the engine has a large aerodynamic drag. Alternatively or in addition the propulsive fan can being configured to be driven by external power source (e.g. an electrical motor) when decoupled through the mechanical clutch device from its primary power source. By actively driving the propulsive fan, if the primary power source is not available (e.g. due to a failure) or is temporarily not needed (e.g. in a descent phase of a flight without applied thrust), the aerodynamic drag can be further reduced.

The issue is also addressed by a method with the features of claim 15.

The operation comprises the active coupling and/or decoupling of two connection parts in a gas turbo engine, in particular a geared aircraft turbofan engine.

A means automatically triggers a position change (e.g. engagement/disengagement) of the mechanical clutch device from the first position into a second position of one of the connecting parts relative to the respective other connection part and/or an engine part in dependence of a torque effective on the connecting parts and/or the engine part, in particular through the transmission via a shaft, in particular a non-nominal torque, more in particular a reversal in the direction of the torque.

One embodiment of the method comprises the disengagement of the mechanical clutch device resulting in the decoupling of the gearbox from other parts of the geared aircraft turbo engine.

Embodiments of the invention are shown in the figures, where

FIG. 7 shows a schematic drawing of the frontal portion of a turbofan engine with a gearbox (star arrangement) with different location of mechanical clutch devices;

Figure 1:
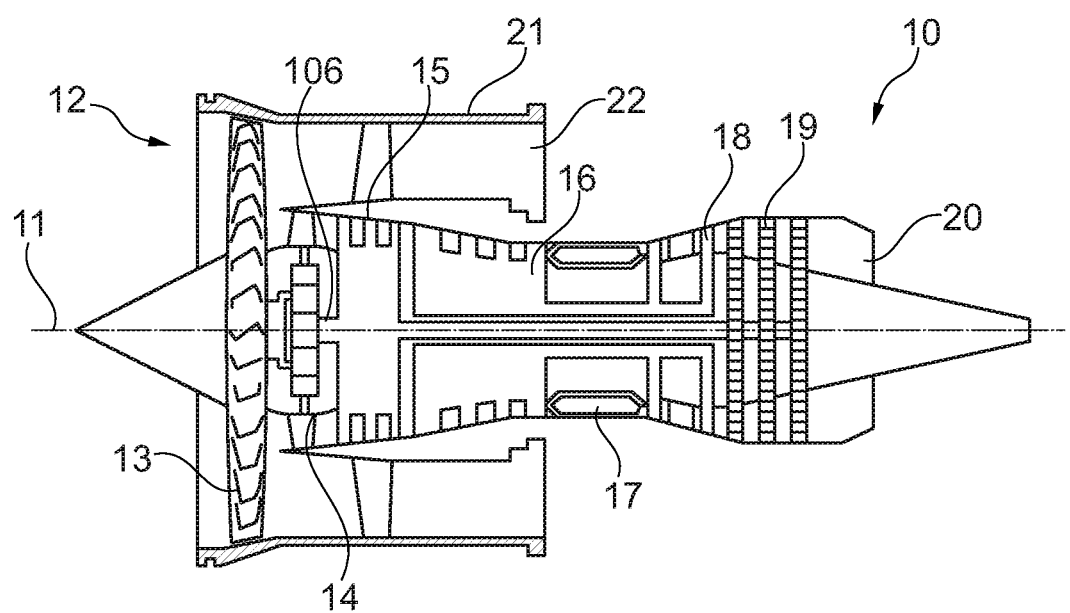
FIG. 1 shows a schematic drawing of a geared aircraft turbofan engine according to the prior art.

With reference to FIG. 1, a geared turbo fan engine is generally indicated at 10, having a principal and rotational axis 11. The engine 10 comprises, in axial flow series, an air intake 32, a propulsive fan 13 (could be more than one stage), a gearbox 14, an intermediate pressure compressor 15, a high-pressure compressor 16, a combustion equipment 17, a high-pressure turbine 18, an intermediate-pressure turbine 19 and an exhaust nozzle 20. A fan casing 21 generally surrounds the engine 10 and defines the intake 32.

The geared turbofan engine 10 works in the conventional manner so that air entering the intake 32 is accelerated by the propulsive fan 13 to produce two air flows: a first air flow into the intermediate pressure compressor 15 and a second air flow which passes through a bypass duct 22 to provide the main propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture is combusted. The resultant hot combustion products then expand through, and thereby drive the high pressure turbine 18 and intermediate pressure turbine 19 before being exhausted through the nozzle 20 to provide additional propulsive thrust. The high pressure turbine 18 and the intermediate pressure turbine 19, respectively, drive the high pressure compressor 16 and the intermediate pressure compressor 15, each by suitable interconnecting shaft assembly.

An intermediate pressure shaft also drives the propulsive fan 13 via the gearbox 14. The gearbox 14 is a reduction gearbox in that it gears down the rate of rotation of the propulsive fan 13 by comparison with the intermediate pressure compressor 15 and intermediate pressure turbine 19.

The gearbox 14 in the embodiment shown is an epicyclic planetary gearbox having a static ring gear, rotating and orbiting planet gears 103 supported by a planet carrier 104 and a rotating sun gear 102. In an alternative embodiment, the gearbox 14 has star arrangement, so that the ring gear can be disconnected from the propulsive fan or the carrier from a structure.

The embodiment shown in FIG. 1 has a specific shaft arrangement which is understood not to be limiting. The embodiments described in the following can also work with a 2- or 3-shaft arrangement.

As shown in FIG. 1, geared turbofan engines 10 are known in the art. With increasing power ratings and/or increasing diameters of the propulsive fans 13, the loads on the geared turbofan engine 10 are increasing. Therefore, it seems advisable to introduce flexible measures to operate rotational parts and e.g. counteract potential failure modes or extreme events such as e.g. a fan blade off, a core blade off, a bird strike, a mainline bearing seizure or a gearbox 14 seizure.

Figure 2A:
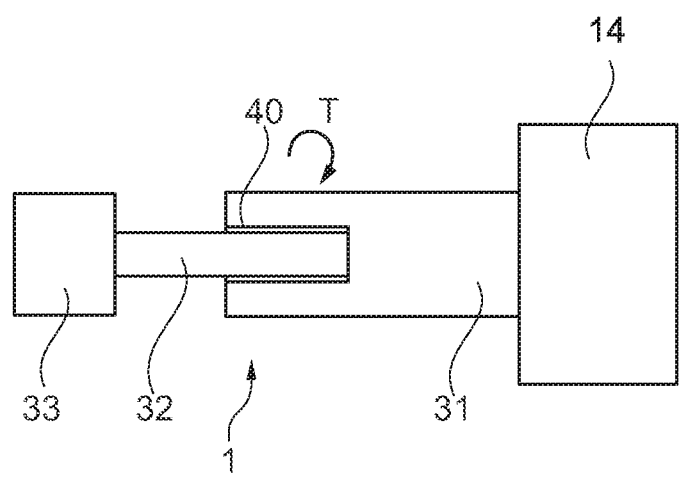
FIG. 2A shows a schematic representation of an embodiment of a mechanical clutch device in a first engaged position.
Figure 2B:
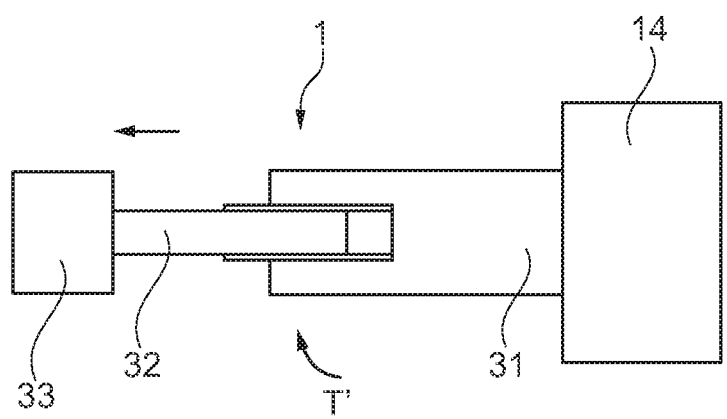
FIG. 2B shows a schematic representation of the embodiment in FIG. 2A in a second disengaged position.

In FIG. 2A, 2B the operation of an embodiment of a mechanical clutch device 1 is shown. This can be used in various locations within the geared turbofan engine, in particular with the geared turbofan engine 10 as shown in FIG. 1.

The mechanical clutch device in the shown embodiment couples two connecting parts 31, 32. Connecting means in this context that the parts can be connected but they can also become disengaged and if technical possible reengaged.

Figure 6:
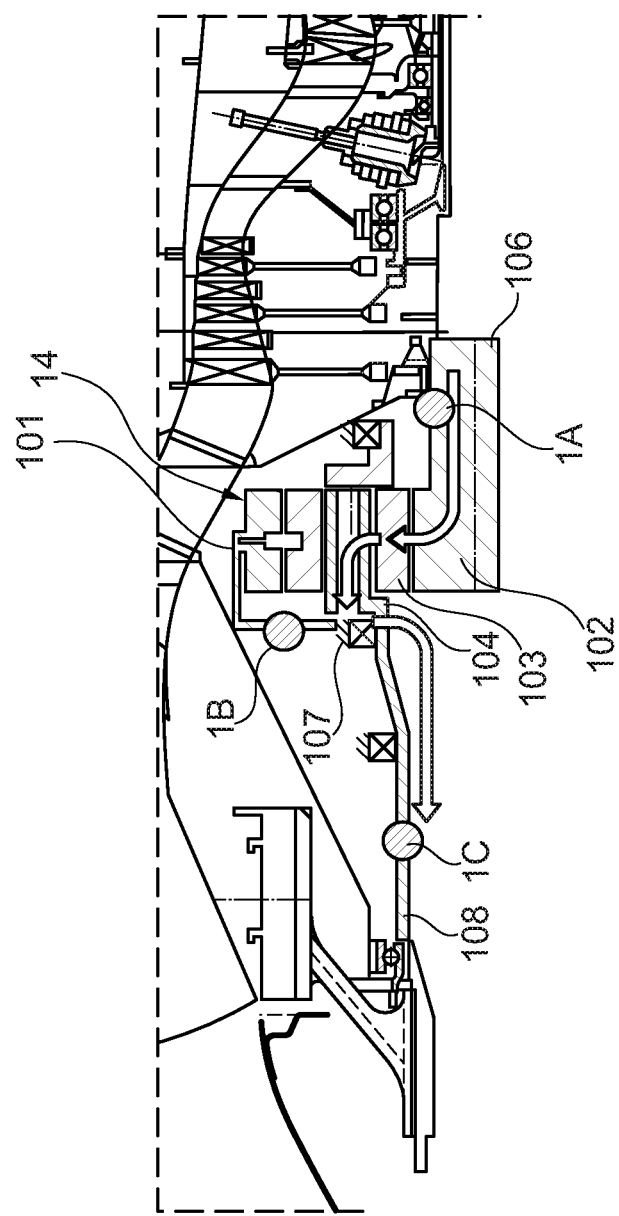
FIG. 6 shows a schematic drawing of the frontal portion of a turbofan engine with a gearbox (planetary arrangement) with different location of mechanical clutch devices.

Typical positions within an aircraft engine of such connecting parts of a mechanical clutch device 1 are shown in FIGS. 6 and 7.

A first engaged position is shown in FIG. 2A. Here, the first connecting part 31 is positioned fixedly relative to a ring gear mount 101 of a gearbox 14 of the geared turbofan engine 10. It should be noted that FIG. 2A shows this geometric relationship only in a very schematic way.

The second connecting part 32 is positioned fixedly relative to an engine part 33, which can be any static part within the geared turbofan engine 10. In FIGS. 6 and 7 the position of a fixed part 107 of an engine is shown.

Furthermore, the mechanical clutch device 1 comprises means 40 for automatically triggering a position change (e.g. an disengagement, engagement, reengagement) of the mechanical clutch device 1 by bringing at least one of the connecting parts 31, 32 relative to the other connecting parts 32, 31 into a disengagement position in dependence of the effective torque T on the connecting parts 31, 32.

The second position (i.e. the disengagement position) is shown in FIG. 2B.

That means that the first and second connecting parts 31, 32 have moved apart. This can be achieved e.g. by moving the first connecting part 31 relative to the second connecting part 32, by moving the second connecting part 32 relative to the first connecting part 31 or a mutual movement of both connecting parts 31, 32. In FIG. 2B the connecting parts 31, 32 are moved apart for reasons of clarity. As will be shown in connection with FIG. 3A, 3B the mechanical clutch device 1 can comprise further engine parts 41.

The movement of the connecting parts 31, 32 is here demonstrated with two parts 31, 32 assembled axially. As will be shown below, the connecting parts 31, 32 can have other geometric conformations and can perform other movements.

The means 40 for automatically triggering the position change (e.g. engagement, disengagement) comprise in the embodiment shown, a helical spline.

Helical splines have ridges or teeth that mesh with grooves in a mating piece and transfer torque to it. A helical spine comprises equally spaced grooves forming a helix about the shaft. The sides may be parallel or involute. This can either minimize stress concentrations for a stationary joint under high load, or allow for rotary and linear motion between the parts. Another feature of the helical spline is that it reacts differently to torque T in different directions. Furthermore, the helical spline generates an axial load which can open or close the mechanical clutch; a helical spline can translate an angular movement into an axial movement. In embodiments shown the helical angle can be between 15 and 75°.

In FIG. 2A, the torque T is applied in the nominal direction and is transmitted through the rotating shafts 106 (see FIG. 1) on the connecting parts 31, 32. The connecting parts 31, 32 are connected in the first engaged position so they can absorb the torque T; the helical spline connection is pulling the connecting parts 31, 32 together.

If the direction of the torque T changes (e.g. into the non-nominal direction T'), the reverse process happens, i.e. the helical spline connection opens into the second position, disengaging two connecting parts 31, 32.

In other embodiments, the means 40 for automatically trigger the position change can comprise e.g. an hydraulic device which is activated depending on the acting torque T, T'. In addition or alternatively, the means for automatically triggering the position change can comprise an automatic clutch.

It should be noted that the reversal of the torque direction T, T' does not have to be connected with a non-nominal event. The disengagement of the mechanical clutch device 1 is effected rather in dependence of the torque effectively present at the connecting parts 31, 32.

Figure 3A:
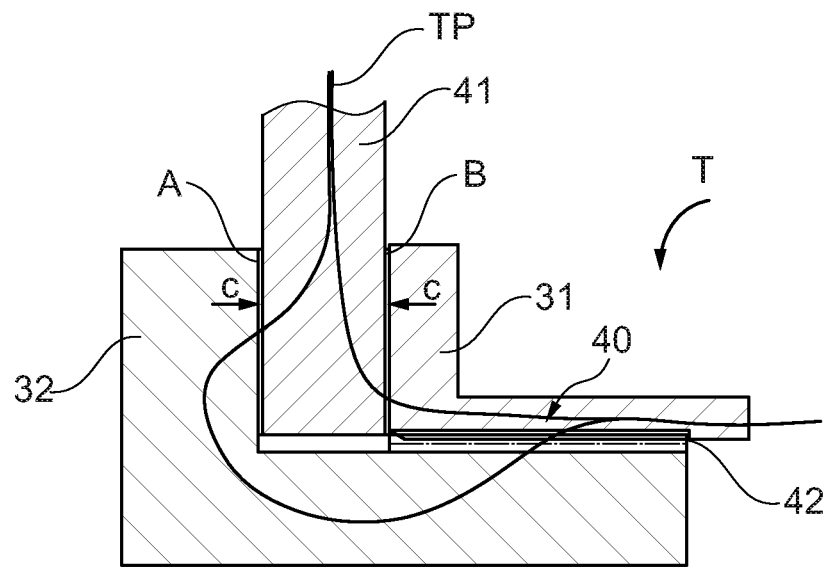
FIG. 3A shows a schematic representation of a further embodiment of the mechanical clutch device in a first engaged position.
Figure 3B:
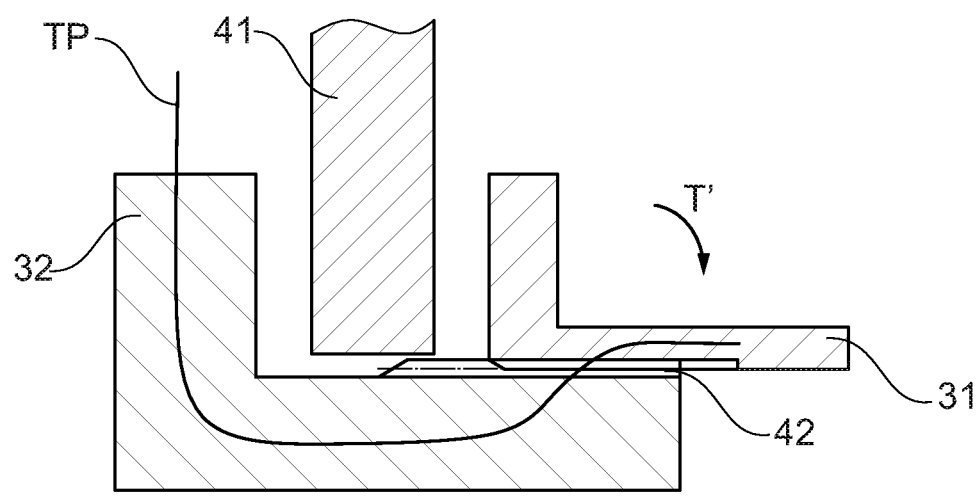
FIG. 3B shows a schematic representation of the embodiment shown in FIG. 3A in a second disengaged position.

In FIG. 3A, 3B a different embodiment is shown involving a mechanical clutch device 1 coupled with a driven engine part 41 in the first position.

The connecting parts 31, 32 interact in the first position (i.e. an engaged position) with the engine part 41 by clamping it (see FIG. 3A) in the first position. This can also be termed as a three plate flange.

The connecting parts 31, 32 become rotable as they are moved apart (see FIG. 3B) into the second position (i.e. a disengaged position). In the embodiment shown the engine part 41 is a part of a front panel.

In FIG. 3A the first connection part 31 is coupled to a ring gear mount 101 of the gearbox 14 (not shown in FIG. 3A). The second connection part 32 is connected to a sleeve. The two connection parts 31, 32 are connected through a helical spline 42. The concept of the helical spline is described in connection with FIG. 2A, 2B so that reference can be made to that description.

In the engaged first position shown in FIG. 3A, the torque path TP is shown. Essentially, the engine part 41 (i.e. sleeve) is clamped between the two connection parts 31, 32.

The connection parts 31, 32 have both ring like sections (i.e. pointing into the radial direction) with parallel interfaces A, B with the engine part 41. The engine part 41 is positioned and clamped between the connection parts 31, 32 by friction-locking. The clamping forces C acting on the interfaces A, B are shown in FIG. 3A.

In other alternatives, the connection parts 31, 32 can be form-locked with the engine part 41. Also, a mixture of form-locking and friction-locking can be used to clamp the engine part 41 in the engaged position.

In FIG. 3B the mechanical clutch device 1 is shown in the second position, i.e. a disengaged position. A reversal from of the torque effective on the connection parts 31, 32 has caused the helical spline connection 42 to move apart, but not completely. Therefore, the friction-locking and/or form-locking of the engine part 41 is disengaged. The disengagement now allows a free rotation of the propulsive fan 13 (see e.g. FIG. 6 or 7).

As shown in FIG. 3B the torque path TP no longer passes through the engine part 41, so that the connecting parts 31, 32 can move freely.

In one embodiment, at the interface A, B of the engine part 41 a coating with a high friction (0.3 to 0.9) coefficient (larger than 0.5) is used to facilitate clamping in the engaged position (FIG. 2A, 3A).

Figure 4A:
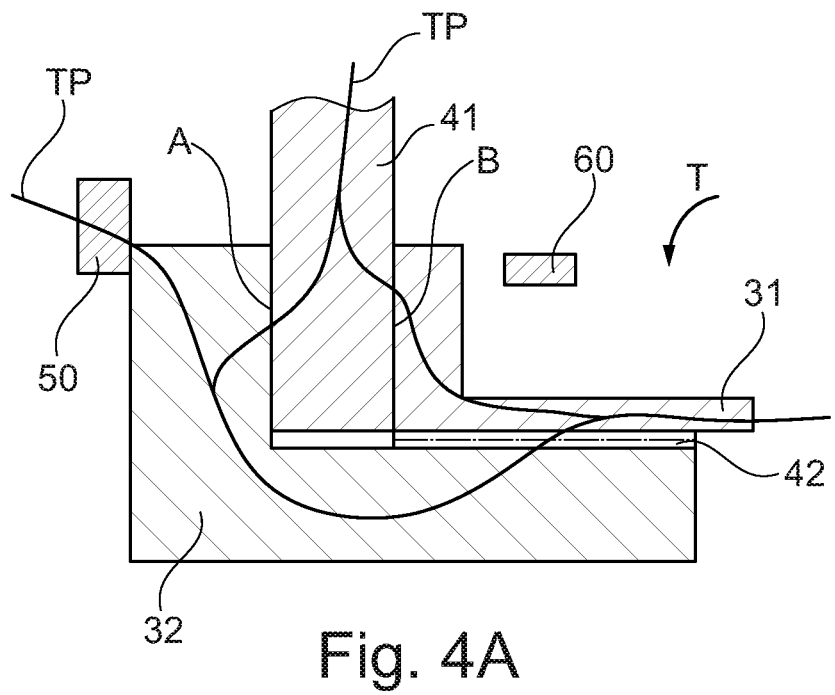
FIG. 4A shows a schematic representation of a further embodiment of the mechanical clutch device in a first engaged position.
Figure 4B:
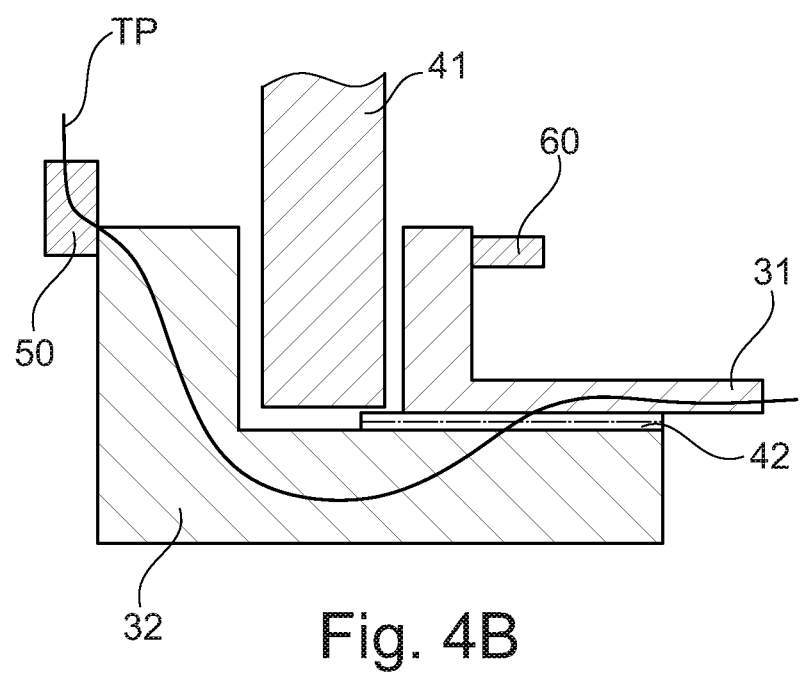
FIG. 4B shows a schematic representation of the embodiment shown in FIG. 4A in a second disengaged position.

In FIG. 4A, 4B a variation of the embodiment in FIG. 3A, 3B is shown so that reference can be made to the respective description.

As in the embodiment shown in FIG. 3A, 3B the first and second connection parts 31, 32 clamp an engine part 41 in a first position. This is the engagement position.

In addition to these parts, a clamping preloading device 50 is in contact with the second connecting part 32. There is a preloading force acting from the preloading device 50 onto the second connecting part 32. Hence, the second connecting part 32 is pressed against the engine part 41 with a preclamping. This achieves some friction even if there is no torque and it put the parts in a fixed position under normal operation. This preload has to be overcome by the force generated by the helical spline before the mechanical clutch (e.g. a clutch) is opening. Further, it guarantees the ability of closure of the clutch with the second connecting part 32 in contact guaranteeing the torque path TP through the helical spline.

This arrangement also results in a different torque path TP. The torque path extends into the torque preloading device 50.

In one embodiment, the torque preloading device 50 comprises a plate for an abutment of the second static part 42. Alternatively or in addition, a spring device or an elastic device can provide some additional preloading force to the second static part 42.

In FIG. 4A also an axial retention device 60 is shown, which limits the axial movements of the first connection part 31. In the first position (shown in FIG. 4A) there is no contact between axial retention device 60 and the first connection part 31.

Embodiments as shown in FIG. 3A, 3B only having an additional axial retention device 60 or a torque preloading device 50 are possible.

In FIG. 4B the embodiment of the mechanical clutch device 1 is shown in a second position in which the engine part 41 is disengaged from the connection part 31, 32. The first connection part 31 now abuts the axial retention device 60. The disengagement now allows a free rotation of the propulsive fan 13.

Figure 5:
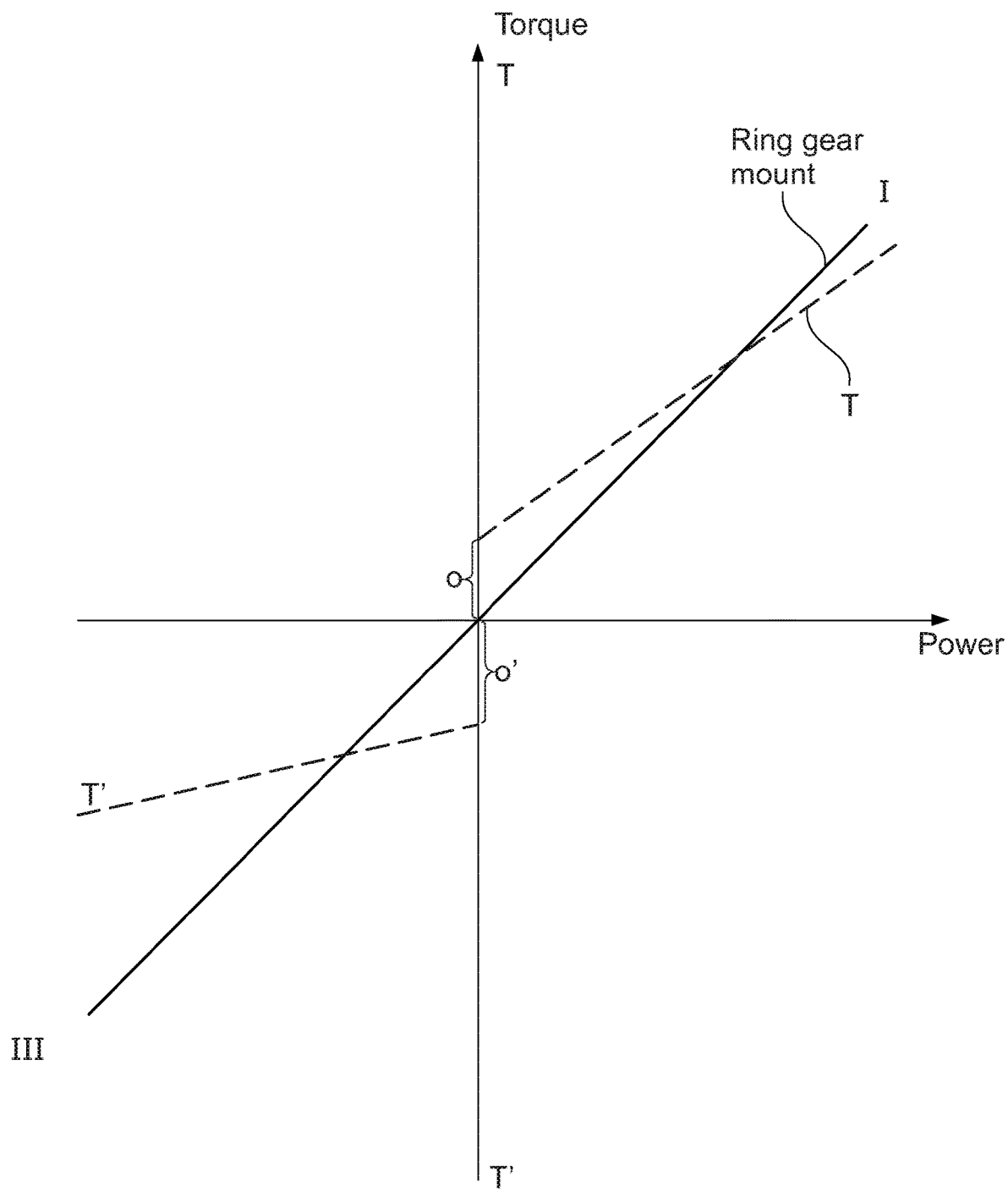
FIG. 5 shows a diagram of the torque and power transmission in an embodiment of the mechanical clutch device.

The effect of the torque preloading 50 can be seen schematically in FIG. 5 illustrating the transmittable torque T, T' through a mechanical clutch device 1.

The power which is generated or consumed by a geared turbofan engine 10 with a propulsive fan 13 is plotted on the x-axis. Positive power values represent nominal operation, i.e. the turbine is driving the system. Negative power values represent a non-nominal case in which the system is driven by the propulsive fan 13 (e.g. windmilling in case of a gearbox failure, no driving through turbine).

The transmittable torque T, T' is plotted on the y-axis.

In the first quadrant I the geared turbofan engine 10 is turbine driven and the torque T is positive, i.e. the operation is nominal.

Due to a pre-loading of the mechanical clutch device, there is a positive intercept of the transmittable torque T line with the y-axis.

The slope of the dashed line indicating the transmittable torque T is smaller than the slope of the line representing the torque the ring gear mount. At the point where the transmittable torque T becomes smaller than the ring gear torque, the clutch in the mechanical clutch begins to slip.

In the third quadrant III the sign of the transmittable torque T' is reversed and the mechanical clutch device 1 moves from the first to the second position disengaging the engine part 41 in the process. The engine part 41 is connected with the propulsive fan 13 which now can turn freely in windmilling mode. Thereby, some torque can be transmitted, which can e.g. drive a generator of generating electrical power.

The torque preloading device 50 has the effect that at zero power generation, i.e. with the engine at rest, some preloaded torque is present. This can be seen by the positive offset O and negative offset O' along the y-axis. This implies that for the change in the position of the connecting parts 31, 32 the preloaded torque needs to be overcome before the clamped engine part 41 becomes disengaged.

At the point at which the absolute value of the transmittable torque T' becomes smaller than the ring gear mount torque, the clutch (i.e. here the mechanical clutch device) disengages.

In FIG. 6 some design context for the placement of the mechanical clutch device 1 is given. The view of FIG. 6 is a cross-section through the front of a geared turbofan engine 10 (see e.g. FIG. 1). Here, the gearbox 14 is having a planetary arrangement.

The turbine (not shown in FIG. 6) is driving the sun gear 102 of the gearbox 14. The torque is transmitted via the planetary gears 103 to the carrier 104 providing the output torque of the gearbox 14 (indicated by the arrow). The ring gear and the ring gear mount 101 are static relative to the other part under nominal conditions.

In the following, three possible locations 1A, 1B, 10 for a mechanical clutch device 1 are discussed.

The first location 1A of a mechanical clutch device 1 is in the driving shaft 106 of the sun gear 102. This means that e.g. the connecting parts 31, 32 are part of the driving shaft. The connecting parts 31, 32 (e.g. like the one shown in FIG. 2A, 2B) can change their relative positions to each other as triggered by a change in the torque direction.

An alternative or additional second location 1B is between the static ring gear mount 101 and a fixed part 107 of the air craft engine.

A further alternative or additional third location 10 is in an output shaft 108 of the gearbox 14.

In each case, two connecting parts 31, 32 are under nominal conditions at rest—static—relative to each other. The connecting parts 31, 32 can disengage under non-nominal conditions. But it also possible that after some time in the disengagement position, a reengagement of the connection parts 31, 32 takes place.

In FIG. 7 a similar embodiment to the one in FIG. 6 is described. The main difference is that the gearbox 14 comprises a star arrangement. In this arrangement the sun gear 102 is driven, driving the planet gears 103 with a fixed carrier 104. The output torque is transmitted via the ring gear mount 101 to the output shaft 108.

The first location 1A of a mechanical clutch device 1 in this arrangement is in the driving shaft 106 of the sun gear 102. This means that e.g. the connecting parts 31, 32 are part of the driving shaft. The connecting parts 31, 32 (e.g. like the one shown in FIG. 2A, 2B) can change their relative positions to each other as triggered by a change in the torque direction.

An alternative or additional second location 1B is between the static carrier 104 and a fixed part 107 of the air craft engine.

A further alternative or additional third location 10 is in an output shaft 108 of the gearbox 14.

In each case, two connecting parts 31, 32 are under nominal conditions at rest—static—relative to each other. The connecting parts 31, 32 can disengage under non-nominal conditions. But it is also possible that after some time in the disengagement position, a reengagement of the connection parts 31, 32 takes place.

FIGS. 6 and 7 show different locations for the mechanical clutch device 1. It is understood that other locations are possible.

Figure 8A:
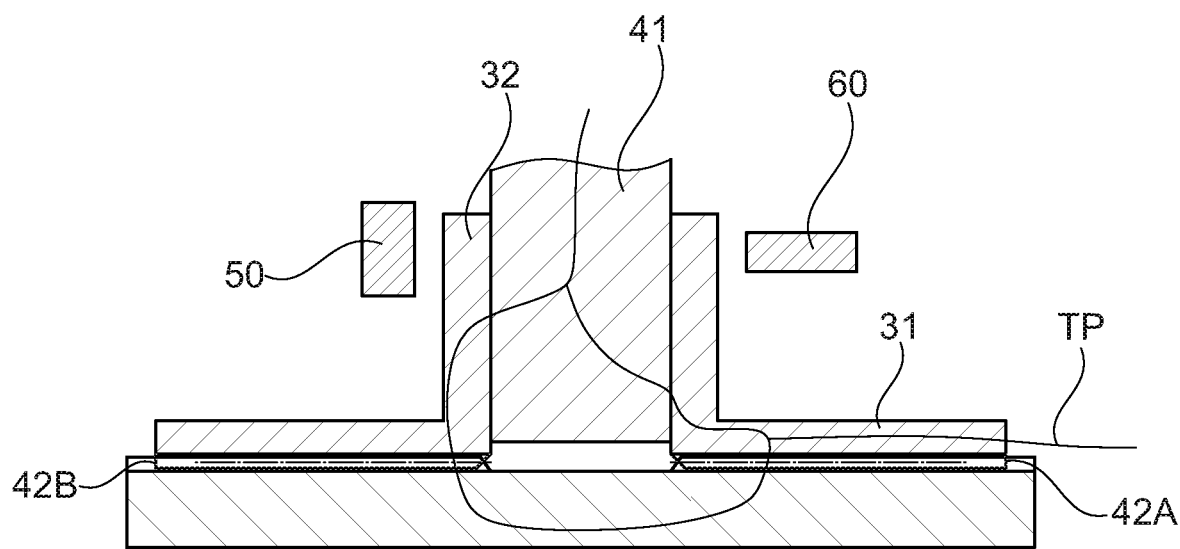
FIG. 8A shows a schematic drawing of an embodiment of a mechanical clutch with a means for balancing axial loads under nominal conditions.
Figure 8B:
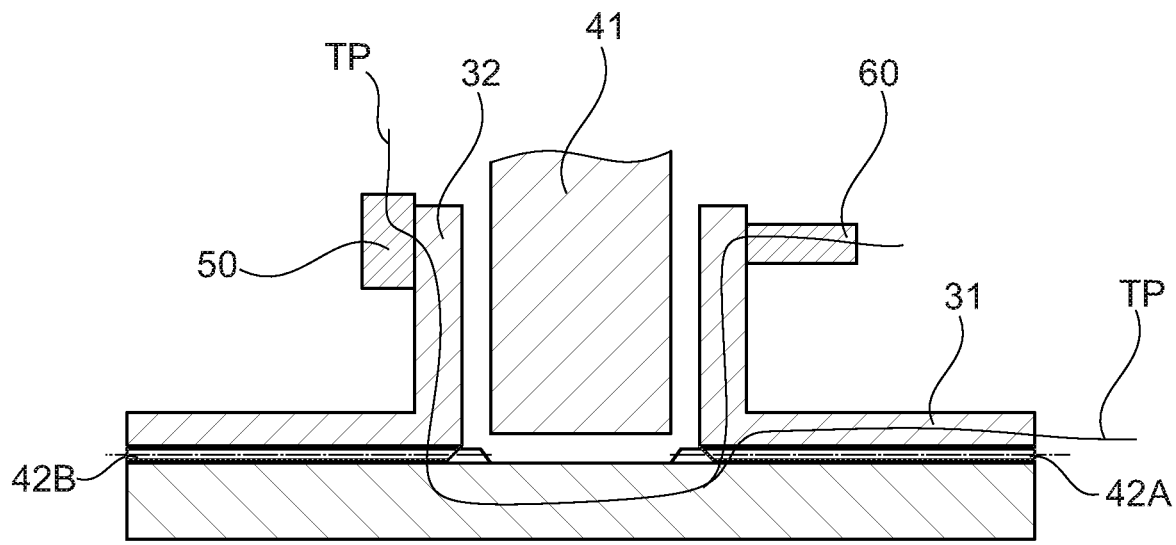
FIG. 8B shows the embodiment of FIG. 8 under torques with different rotation directions.

In FIGS. 8A and 8B an embodiment of a mechanical clutch 1 with two helical spline connections 42A, 42B is shown. The embodiment is a variation of the embodiments described in connection with FIG. 3A, 3B, 4A, 4B so that reference can be made to the respective description.

As in the embodiment of FIG. 4A, 4B the first and second connection parts 31, 32 clamp an engine part 41 in a first position. This is the engagement position shown in FIG. 8A. But here both connection parts 31, 32 comprise helical spline connections 42A, 42B. The rotational arrangement are such that under nominal conditions (FIG. 8A) the torque flow causes axial loads in opposite directions on the engine part 41 (e.g. a front panel). The balanced axial load still clamps the engine part 41.

If the torque direction for some reason is reversed, the helical spline connections 42A, 42B are moving apart, so that no clamping force is acting on the engine part 41 (FIG. 8B). The torque path TP now goes from the first connection part 31 to the second connecting 32 without going through the engine part 41.

The embodiments described herein can e.g. be used in connection with a management of the rotatory behavior of the propulsive fan 13. Under certain operating conditions, the propulsive fan 13 is not required to provide thrust (e.g. windmilling after a gearbox 14 seizure or another failure, descent phase of an airplane). The decoupling of the propulsive fan 13 using a mechanical clutch device 1 provides an operation regime in which the propulsive fan 13 can freely rotate. If e.g. the operation requires a reengagement, the mechanical clutch device 1 couples the propulsive fan 1 back to a torque T source, e.g. a turbine stage.

LIST OF REFERENCE NUMBERS 1 mechanical clutch device
1A location for mechanical clutch device
1B location for mechanical clutch device
1C location for mechanical clutch device
10 geared turbo engine
11 principal rotational axis
12 air intake
13 propulsive fan
14 gearbox, power gearbox
15 intermediate pressure compressor
16 high-pressure compressor
17 combustion equipment
18 high-pressure turbine
19 intermediate-pressure turbine
20 exhaust nozzle
21 fan casing
22 by-pass duct
31 first connecting part
32 second connecting part
33 engine part
40 means for automatically triggering the mechanical clutch device
41 engine part, front panel
42 helical spline connection
42A first helical spline connection
42B second helical spline connection
50 clamping preloading device
60 axial retention device
101 ring gear mount
102 sun gear of power gearbox
103 planetary gear
104 carrier
106 driving shaft of sun gear
107 fixed part of engine
108 output shaft of gearbox
A first interface between parts
B second interface between parts
O offset of torque due to preloading (nominal direction)
O' offset of torque due to preloading (non-nominal direction)
T torque (nominal direction)
T' torque (non-nominal direction)
TP torque path

The invention claimed is:

1. A mechanical clutch device for coupling two connecting parts in a gas turbo engine, comprising:
a position change device for automatically triggering a position change, in at least one of the two connecting parts relative to at least one chosen from the respective other of the two connecting parts and an engine part, from a first position into a second position in dependence of a torque effective on at least one chosen from the two connecting parts and the engine part,
wherein the engine part is positioned in the first position fixedly relative to the two connecting parts and in the second position at least one of the two connecting parts is movable relative to the engine part,
wherein, in the first position, the engine part and at least one of the two connecting parts are in a pressure plate arrangement with one another such that axial pressure therebetween provides a locking arrangement, and
a clamping preloading device to apply a predetermined preload force to the mechanical clutch device;
wherein at least one of the two connecting parts is coupled to at least one chosen from an input shaft and an output shaft of a gearbox.

2. The mechanical clutch device according to claim 1, wherein the position change device comprises at least one chosen from a helical spline connection between the two connecting parts, an automatic clutch device and a hydraulic device for changing the position from the first position to the second position.

3. The mechanical clutch device according to claim 2, and further comprising at least one chosen from:
wherein torque transmission characteristics of the helical spline connection are asymmetric relative to the torque applied to the helical spline connection, and
the automatic clutch device is suitable for balancing axial loads.

4. The mechanical clutch device according to claim 1, wherein in the first position, the two connecting parts are mechanically engaged with at least one chosen from each other and the engine part, so that torque is transmittable between the connecting parts, and in the second position, the two connecting parts are mechanically disengaged at least one chosen from each other and the engine part, enabling a torque-free relative movement between the two connecting parts and the engine part.

5. The mechanical clutch device according to claim 1, and further comprising at least one chosen from:
wherein at least one of the two connecting parts is coupled to a ring gear mount of the gearbox,
wherein at least one of the two connecting parts is rigidly connected to the ring gear mount of the gearbox,
wherein at least one of the two connecting parts is one piece with the ring gear mount of the gearbox, and
wherein at least one of the two connecting parts is coupled with a static structure of the gas turbo engine.

6. The mechanical clutch device according to claim 1, wherein the two connecting parts comprise contact interfaces to the engine part, the contact interfaces being parallel to each other.

7. The mechanical clutch device according to claim 1, wherein the engine part comprises a ring structure which is positioned in the first position of the mechanical clutch device between the two connecting parts, and wherein the two connecting parts also comprise ring structures.

8. The mechanical clutch device according to claim 1, and further comprising an axial retention device.

9. The mechanical clutch device according to claim 1, wherein a connection between the at least one of the two connecting parts and the engine part comprises a high friction coating on at least one surface of an interface of the connection.

10. The mechanical clutch device according to claim 8, wherein at least one chosen from a connection between the clamping preloading device and the engine part and a connection between the axial retention device and the at least one of the two connecting parts comprises a low friction coating on at least one surface.

11. The mechanical clutch device according to claim 1, and further comprising at least one chosen from:
the mechanical clutch device being coupled to a propulsive fan of a geared aircraft turbofan engine, the propulsive fan suitable for driving an electrical generator in windmilling operation conditions; and
the propulsive fan suitable for being driven by an external power source when decoupled through the mechanical clutch device from a primary power source for the propulsive fan.

12. The mechanical clutch device according to claim 1, wherein:
the gas turbo engine is a geared aircraft turbofan engine,
the position change device for automatically triggering the position change from the first position into the second position in dependence of the torque is carried out through a transmission via a shaft, wherein the torque is a non-nominal torque and there is a reversal in a direction of the torque,
wherein the engine part is friction locked with the connecting parts, and
wherein the clamping preloading device presses at least one of the two connecting parts against the engine part with a preload force.

13. The mechanical clutch device according to claim 1, wherein the gearbox is a planetary gearbox.

14. The mechanical clutch device according to claim 1, wherein the two connecting parts comprise contact interfaces to the engine part, the contact interfaces being angled to each other.

15. A method for operating a mechanical clutch device coupling two connecting parts in a gas turbo engine, comprising:
automatically triggering a position change of the mechanical clutch device from a first position into a second position of at least one of two connecting parts relative to at least one chosen from the respective other of the two connecting parts and an engine part in dependence of a torque effective on at least one chosen from the two connecting parts and the engine part,
wherein the engine part is positioned in the first position fixedly relative to the two connecting parts and in the second position at least one of the two connecting parts is movable relative to the engine part,
wherein, in the first position, the engine part and at least one of the two connecting parts are in a pressure plate arrangement with one another such that axial pressure therebetween provides a locking arrangement, and
applying a predetermined preload force to the mechanical clutch device;
providing that at least one of the two connecting parts is coupled to at least one chosen from an input shaft and an output shaft of a gearbox.

16. The method according to claim 15, wherein:
the gas turbo engine is a geared aircraft turbofan engine,
the automatically triggering the position change of the mechanical clutch device from the first position into the second position in dependence of the torque is carried out through a transmission via a shaft, wherein the torque is a non-nominal torque and there is a reversal in a direction of the torque,
wherein the engine part is friction locked with the connecting parts, and
wherein the clamping preloading device presses at least one of the two connecting parts against the engine part with a preload force.

17. A mechanical clutch device for coupling two connecting parts in a gas turbo engine, comprising:
a position change device for automatically triggering a position change, in at least one of the two connecting parts relative to at least one chosen from the respective other of the two connecting parts and an engine part, from a first position into a second position in dependence of a torque effective on at least one chosen from the two connecting parts and the engine part,
wherein the engine part is positioned between the two connecting parts,
wherein, in the first position, the two connecting parts are positioned to axially clamp the engine part between the two connecting parts in a fixed relationship relative to rotation and in the second position, at least one of the two connecting parts is positioned axially away from the engine part to allow relative rotational movement between the engine part and at least one of the two connecting parts,
a clamping preloading device to apply a predetermined preload force between the two connecting parts in the first position;
wherein at least one of the two connecting parts is coupled to at least one chosen from an input shaft and an output shaft of a gearbox.

\* \* \* \* \*